United States Patent
Shah

[15] 3,653,823
[45] Apr. 4, 1972

[54] REMOVAL OF SULFUR DIOXIDE FROM GAS STREAMS

[72] Inventor: Indravadan S. Shah, 108-26 63rd Road, Forest Hills, N.Y. 11375

[73] Assignee: Chemical Construction Corporation, New York, N.Y.

[22] Filed: Feb. 27, 1970

[21] Appl. No.: 14,947

[52] U.S. Cl. ............................ 23/129, 23/2, 23/177, 23/178, 23/201
[51] Int. Cl. ............. C01f 5/42, C01b 17/48, C01b 17/56
[58] Field of Search .............. 23/178 S, 178 R, 129, 130, 23/131, 132, 133, 2

[56] References Cited

UNITED STATES PATENTS

| | | | |
|---|---|---|---|
| 1,192,640 | 7/1916 | Jardine | 23/130 |
| 3,273,961 | 9/1966 | Rogers et al. | 23/130 X |
| 3,537,820 | 11/1970 | Markant et al. | 23/131 X |
| 3,420,682 | 1/1969 | Gensler | 23/129 X |
| 2,572,929 | 10/1951 | Hazelquist | 23/130 |
| 2,351,780 | 6/1944 | Palmrose | 23/130 |
| 3,475,121 | 10/1969 | Thornton | 23/178 R |
| 3,533,748 | 10/1970 | Finfer et al. | 23/226 R |
| 3,428,420 | 2/1969 | Douglas et al. | 23/132 |
| 2,238,456 | 4/1941 | Tomlinson | 23/131 X |
| 3,542,511 | 11/1970 | Shah | 23/130 X |
| 3,577,219 | 5/1971 | Shah | 23/178 R |

Primary Examiner—Edward Stern
Attorney—J. L. Chaboty

[57] ABSTRACT

A gas stream containing sulfur dioxide, such as a waste or flue gas, is scrubbed with a circulating aqueous slurry containing magnesium oxide and magnesium sulfite, to remove sulfur dioxide from the gas stream in the form of hydrated magnesium sulfite, under specific conditions such as relatively high pH which promote greater scrubbing efficiency.

6 Claims, 1 Drawing Figure

Patented April 4, 1972
3,653,823
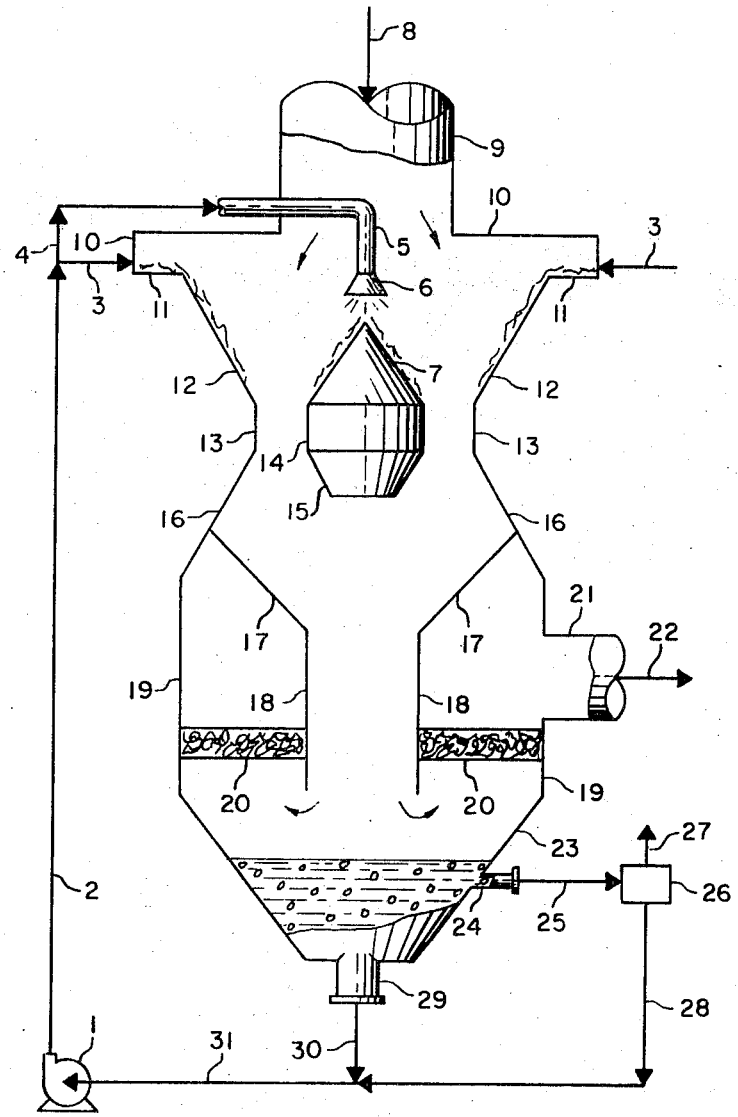
INDRAVADAN S. SHAH
INVENTOR.
BY J. J. Chaloty
AGENT

REMOVAL OF SULFUR DIOXIDE FROM GAS STREAMS

BACKGROUND OF THE INVENTION

Field of the Invention

The invention relates to the removal of sulfur dioxide from gas streams such as waste or flue gases, to recover the sulfur dioxide and prevent air pollution. A circulating aqueous magnesium oxide-sulfite slurry is employed to scrub the gas stream, with the resultant formation of further magnesium sulfite, and a bleed stream of aqueous slurry is withdrawn, converted to solid material by centrifuging or filtering and drying, and calcined to generate a sulfur dioxide-rich gas stream and regenerated magnesium oxide. The invention is particularly applicable to the scrubbing of waste gas streams, such as stack or flue gases from a power boiler, or other waste gases such as the tail gas from a sulfuric acid process, smelter off-gases etc. The process of the present invention provides high efficiency scrubbing and high removal of sulfur dioxide, with resultant prevention of air pollution.

Description of the Prior Art

Developments in the improved scrubbing of gas streams with aqueous magnesium base solutions for sulfur dioxide removal have been important in the wood pulping technology, which employs magnesia-base pulping to produce wood pulp. The residual red liquor is concentrated and burned to produce regenerated magnesium oxide and an off-gas rich in sulfur dioxide. The magnesium oxide is slurried and slaked with water and employed to scrub the off-gas, so as to produce a regenerated acid magnesium bisulfite solution which is employed in the wood pulp process. U. S. Pat. Application No. 766,596 filed Oct. 10, 1968 is directed to an improvement in this art. In recent years, the scrubbing of waste gases such as flue or stack gases, or tail gas from chemical processes such as sulfuric acid, to remove sulfur dioxide and prevent air pollution, has assumed increasing importance. The use of magnesium oxide-sulfite or magnesium sulfite-bisulfite solutions or slurries for this purpose is generally described in U. S. Pat. Applications Nos. 737,186 filed June 14, 1968 and now U.S. Pat. No. 3,617,212 and 772,547 filed Nov. 1, 1968 and issued as U.S. Pat. No. 3,577,219 on May 4, 1971. Other disclosures include Chemical Processing V. 33 no. 1, issue for Jan. 1970 page 47; U. S. Pats. Nos. 3,428,420; 3,284,435; 3,273,961; 3,092,535 and 3,046,182; Canadian Pat. No. 822,001 and British Pat. No. 708,095.

SUMMARY OF THE INVENTION

In the present invention, a process is provided for the removal of sulfur dioxide from a gas stream such as waste or tail gas from a chemical process, or the flue or stack gas from a steam power boiler or the like, or any gas stream generated by the combustion of a sulfur-containing fuel. The present process is highly beneficial in the prevention of air pollution. The gas stream containing sulfur dioxide is scrubbed with a circulating aqueous slurry containing solid magnesium oxide and magnesium sulfite, at a relative slurry to gas flow rate in the range of 0.7 to 7.0 liters/ actual cubic meter of gas, with the temperature of the slurry being maintained in the range of 20° C. to 95° C. by external cooling, if required, so that magnesium sulfite is principally present in the hydrated crystalline form. The pH of the slurry is maintained in the range of 5.5 to 9.5 by controlled addition of makeup magnesium oxide to the circulating slurry. A portion of the circulating slurry is withdrawn for regeneration, and the withdrawn portion is controlled to about 1 to 30 percent of the total circulating slurry. The withdrawn portion is centrifuged or filtered, dried and then heated, preferably by calcining the solids component, to evolve a sulfur dioxide-rich gas stream and regenerate magnesium oxide which is recycled to the circulating slurry as makeup. The sulfur dioxide-rich gas stream is processed to recover sulfur values as liquid sulfur dioxide or sulfuric acid, or elemental sulfur or a suitable sulfur containing compound.

The principal advantage of the invention is that sulfur dioxide is removed and recovered from a gas stream in a highly efficient manner, and the recovered sulfur dioxide is produced in a concentrated form which may be readily processed to valuable sulfur-containing products. Another advantage is that air pollution due to the emission of sulfur dioxide in waste gases is prevented. A further advantage is that high sulfur dioxide removal efficiency is attained by operation of the process within the process ranges enumerated supra.

It is an object of the present invention to remove and recover sulfur dioxide from a gas stream in an improved manner.

Another object is to prevent air pollution due to the emission of waste gases containing sulfur dioxide.

A further object is to provide a highly efficient process for the removal of sulfur dioxide from a gas stream using a circulating magnesium oxide-sulfite slurry.

An additional object is to provide a process for sulfur dioxide removal which attains highly improved results when operated within specific ranges of operating parameters including liquid to gas ratio, temperature and pH.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. A slurry pump 1 circulates aqueous slurry stream 2 to the process. Stream 2 is an aqueous slurry containing generally in the range of about 1 to 30 percent total solids by weight, and usually less than about 10 percent of the total solids in stream 2 consists of magnesium oxide, with most of the solids component consisting of hydrated crystalline magnesium sulfite. The temperature of the circulating slurry stream 2 is generally in the range of 20° C. to 95° C., and slurry temperature will primarily depend on the initial temperature of the gas stream being scrubbed and the resulting saturated gas temperature. In instances when the temperature of stream 2 is below 40° C., the magnesium sulfite will be principally present in the aqueous slurry as solid crystals of magnesium sulfite hexahydrate, and when the temperature of stream 2 is above 40° C, magnesium sulfite will be principally present in stream 2 as solid crystals of magnesium sulfite trihydrate.

Stream 2 is divided into stream 3 and stream 4. Stream 3 is utilized in the scrubbing process as will appear infra, while stream 4 is passed downwards via pipe 5 and spray nozzle 6 and is axially sprayed onto the apex of the central conical flow diversion baffle 7, and is also used for scrubbing the flue gas.

A gas stream 8 containing sulfur dioxide is passed downwards through vertical conduit 9, which is preferably coaxially disposed above conical baffle 7. Stream 8 is typically a waste gas stream containing in the range of 0.01 to 8.0 percent sulfur dioxide content by volume, and stream 8 is typically at an initial temperature in the range of 40° C to 350° C. The relative flow rate of the slurry scrubbing stream 2, or stream 3 plus stream 4, is maintained in the range of 0.7 to 7.0 liters of slurry per actual cubic meter of gas stream 8. The gas stream discharged downwards from conduit 9 flows into the annular venturi passage below the annular horizontal baffle 10. An annular horizontal shelf 11 is spaced below baffle 10, and the slurry stream 3 is passed onto shelf 11, either as a single stream which may be tangentially injected or as a plurality of portions.

The annular venturi passage is defined by the inverted frusto-conical baffle 12, which depends downward from shelf 11 and is spaced about conical baffle 7, so as to define an annular approach section, together with vertical cylindrical baffle 13, which depends downwards from baffle 12 and is spaced concentrically about the vertical cylindrical baffle 14, which depends downwards from conical baffle 7. The annular vertical passage between baffles 13 and 14 defines the throat section of the annular venturi passage. Streams 3 flow downwards on the inner surface of baffle 12 and are projected into the high velocity gas stream in the throat section, while stream 4 flows downwards on the outer surface of conical baffle 7 and is also projected into the gas stream at the throat section. The gas stream, which has been accelerated to high velocity by the converging approach section defined by baffles 7 and 12, is effectively scrubbed for sulfur dioxide removal in the throat section defined by the annular vertical passage between baffles 14 and 13. A portion of the magnesium oxide in the aqueous slurry is thereby converted to magnesium sulfite.

The resulting mixture of aqueous slurry particles dispersed in the gas stream, which is discharged downwards from the annular throat section, passes downwards into the diverging pressure regain section defined by the central inverted frusto-conical baffle 15, which depends downwards from baffle 14, and the annular frusto-conical baffle 16, which depends downwards from baffle 13. Separation of aqueous slurry from the scrubbed gas phase is preferably attained by providing slurry impingement and retention baffle 17, which is a frusto-conical baffle which depends from baffle 16 and is provided with a lower central cylindrical extension baffle 18. The baffles 17 and 18 are generally disposed in the vertical cylindrical slurry-gas separating section or container 19, which depends downwards from the lower extremity of baffle 16. A flat horizontal annular ring-shaped mesh pad or packed bed 20 extends between elements 18 and 19, and section 20 serves as an entrainment separator, to separate entrained liquid droplets from the scrubbed gas phase which flows downwards through baffle or conduit 18 and upwards through the annular passage between elements 18 and 19. The scrubbed gas is removed via conduit 21, which extends from container 19 and passes the scrubbed gas stream 22 to suitable disposal such as atmospheric discharge via a stack, not shown.

The separated aqueous slurry phase collects below container 19 in the slurry retention section 23. A portion of the slurry in the range of 3 to 20 percent by weight of the total circulating slurry is withdrawn from section 23 via nozzle 24 as stream 25, which is processed for regeneration of magnesium oxide in unit 26, which typically consists of a filter or dryer, not shown, and a kiln or calciner for heating of the solids component. The solid magnesium salts component is generally heated to a temperature in the range of 200° C to 600° C in section 26, to decompose magnesium sulfite and evolve a gas phase stream 27 rich in sulfur dioxide, leaving a residual solid magnesium oxide component. The rich gas phase stream 27 may be cooled to condense product liquid sulfur dioxide, or the gas phase may be passed to a sulfuric acid production facility or the like for recovery of sulfur dioxide as a valuable sulfur-containing product.

The regenerated solid magnesium oxide formed in section 26 is removed via stream 28, which is utilized in accordance with the present invention as makeup magnesium oxide to adjust the pH of the circulating slurry to an optimum level. The main body of circulating aqueous slurry is removed from the bottom of unit 23 via nozzle 29 as stream 30, which is combined with stream 28 to form stream 31. In most cases stream 28 will be added in the form of an aqueous slurry, produced by slurrying the solids discharged from unit 26 with water. Stream 28 can also be added as dry powder. In any case, the resultant total slurry stream 31 is formed at a pH in the range of 5.5 to 9.5 by the addition of stream 28. Stream 31 is passed to slurry pump 1 and recycled as stream 2.

Numerous alternatives within the scope of the present invention will occur to those skilled in the art. Various types of gas-liquid contact devices may be employed to contact the gas stream 8 with the circulating aqueous slurry. Various types of entrainment or mist separators can be also used. In some instances, elements 7, 14 and 15 may be omitted, in which case a simple wet approach venturi contactor will be employed, defined by sections 12, 13 and 16. Central axial injection of a slurry portion stream 4 via spray nozzle 6 is preferably provided in any case, to attain optimum scrubbing efficiency. In instances when stream 8 contains sulfur trioxide or sulfuric acid mist, such as when stream 8 is derived as the tail gas from a sulfuric acid production facility, the circulating slurry will contain a proportion of magnesium sulfate which will be maintained at an acceptable level by disposal of excess via stream 25 and unit 26. In other instances, a small amount of magnesium sulfate will form in the system due to in situ oxidation of magnesium sulfite. Additional makeup magnesium oxide derived from an external source may also be added to stream 30 in suitable instances, generally in the form of an aqueous magnesium oxide slurry. In some cases, makeup water per se may also be introduced into the system, generally by addition to stream 31. In instances when fly ash or other entrained solid particles are present in stream 8, the fly ash will also be removed from the gas stream in the gas-liquid venturi contactor, and fly ash will be present in the circulating aqueous slurry. Excessive buildup of fly ash in the system may be prevented by periodic or continuous bleed or purge of a portion of stream 28 or stream 30, or by the system described in U. S. Pat. Application No. 883,485 filed Dec. 9, 1969.

An example of test data and results obtained in a study of the operating characteristics and ranges of operating variables within the scope of the present invention will now be described.

EXAMPLE

TABLE I - Effect of L/G, Liquid Slurry to Gas Ratio

| L/G liters per actual cubic meter of gas | Inlet Sulfur Dioxide p.p.m.* | Outlet Sulfur Dioxide p.p.m.* | Efficiency % |
|---|---|---|---|
| 1.34 | 1500 | 225 | 85 |
| 2.68 | 1500 | 162 | 89.2 |
| 4.02 | 1500 | 100 | 93.3 |
| 5.36 | 1500 | 30 | 98 |

* parts per million

TABLE II - Effect of Spray Nozzle Element 6

| Variable | Spray Nozzle on | Spray Nozzle off |
|---|---|---|
| Sulfur Dioxide In p.p.m. | 6900+ | 6900+ |
| Sulfur Dioxide Out p.p.m. | 290 | 542 |
| Efficiency | 96+ | 92.1 |

TABLE III - Effect of pH of Aqueous Scrubbing Slurry

| pH | % Efficiency | Inlet Sulfur Dioxide p.p.m. |
|---|---|---|
| 8.8 | 96 | 2300 |
| 8.25 | 92.6 | 2300 |
| 5.8 | 91 | 2300 |
| 4.5 | 80 | 2300 |

| pH of test: | 7.0 | 8.0 |
|---|---|---|
| Solids Analysis, weight % | | |
| Magnesium sulfite hexahydrate | 84.9 | 92.3 |
| Magnesium sulfate heptahydrate | 4.7 | 6.7 |
| Magnesium Oxide | 10.4 | 2.9 |

I claim:

1. A process for the removal of sulfur dioxide from a gas stream and production of solid hydrated magnesium sulfite which comprises scrubbing a gas stream containing sulfur dioxide with a circulating aqueous slurry containing magnesium oxide and magnesium sulfite, said gas stream being passed downwards through a vertically oriented annular venturi passage provided with a central conical flow diversion baffle, with a first portion of said aqueous slurry being sprayed centrally downwards above the apex of said conical baffle and into said venturi passage, and a second portion of said aqueous slurry flowing downwards on the inner surface of the upper converging section of said venturi passage, whereby said gas stream is scrubbed with said aqueous slurry in the annular throat section of said venturi passage and sulfur dioxide is absorbed into said aqueous slurry to form further magnesium sulfite, said magnesium oxide being present in said aqueous slurry in excess of the stoichiometric requirement to react with said sulfur dioxide, with a relative slurry to gas flow rate in the range of 0.7 to 7.0 liters of slurry per actual cubic meter of gas being maintained during gas scrubbing, and with the temperature of said slurry being in the range of 20° C to 95° C whereby said magnesium sulfite is principally present in the hydrated crystalline form, with the pH of said slurry being maintained in the range of 5.5 to 9.5 by controlled addition of makeup magnesium oxide to said circulating slurry, separating the resulting scrubbed gas stream of depleted sulfur dioxide content from the resulting aqueous slurry, separating entrained liquid droplets from the resulting scrubbed gas stream, withdrawing a controlled portion of said slurry for regeneration, said portion containing magnesium oxide and magnesium sulfite and being in the range of about 1 to 30 percent of the circulating slurry, heating the solids component of said withdrawn portion whereby a sulfur dioxide-rich gas stream is evolved and magnesium oxide is regenerated, and recycling said regenerated magnesium oxide as said makeup magnesium oxide.

2. The process of claim 1, in which said gas stream is a waste gas stream containing in the range of 0.01 to 8 percent sulfur dioxide content by volume, and said waste gas stream is at an initial temperature in the range of 40° C to 350° C.

3. The process of claim 1, in which said circulating slurry contains solid magnesium oxide in an amount less than about 10 percent of the total solids in said slurry.

4. The process of claim 1, in which said makeup magnesium oxide is added to said circulating slurry in the form of an aqueous slurry.

5. The process of claim 1, in which the temperature of said circulating aqueous slurry is below 40° C, and said magnesium sulfite is principally present in said aqueous slurry as solid crystals of magnesium sulfite hexahydrate.

6. The process of claim 1, in which the temperature of said circulating aqueous slurry is above 40° C, and said magnesium sulfite is principally present in said aqueous slurry as solid crystals of magnesium sulfite trihydrate.

* * * * *